Aug. 26, 1924.

N. D. STURGES

BATTERY

Filed Dec. 13, 1922

1,506,391

INVENTOR
Norman Dexter Sturges
BY
Pennie Davis Marvin & Edmonds
his ATTORNEYS

Patented Aug. 26, 1924.

1,506,391

UNITED STATES PATENT OFFICE.

NORMAN DEXTER STURGES, OF BELLEROSE, NEW YORK.

BATTERY.

Application filed December 13, 1922. Serial No. 606,610.

*To all whom it may concern:*

Be it known that I, NORMAN DEXTER STURGES, a citizen of the United States, residing at Bellerose, in the county of Nassau, State of New York, have invented certain new and useful Improvements in Batteries; and I do hereby declare the following to be a full, clear, and exact description of the invention, such as will enable others skilled in the art to which it appertains to make and use the same.

This invention relates to storage batteries, and particularly to improvements therein whereby the plates are insulated without employing separators.

Storage batteries are commonly provided with separators of wood or hard rubber which are interposed between each pair of elements to prevent contact between the elements and consequent short-circuiting of the battery. These separators deteriorate rapidly, particularly when made of wood, and are often broken when the battery is disassembled for inspection or repair. The separators very materially increase the internal resistance of the battery, and in the case of wood contaminate the electrolyte with soluble constituents of the wood. Wood separators are particularly undesirable when used with jelly electrolytes probably because the soluble organic substances in the wood, which are dissolved by the electrolyte, are not disseminated so readily as with liquid electrolytes.

It is the object of the present invention to avoid the use of separators by employing insulating bands of celluloid or equivalent material, and in the present instance these bands consist of material which is readily available in the market in continuous lengths so that it may be applied to battery elements of any size, preferably by winding about the elements in the manner hereinafter described. Besides overcoming the disadvantages of separators, these bands have the advantage of facilitating the manufacture and assembly of battery elements. The expensive separators are eliminated and the cost of production of the batteries is reduced while the life of the battery is materially prolonged.

Figure 1:
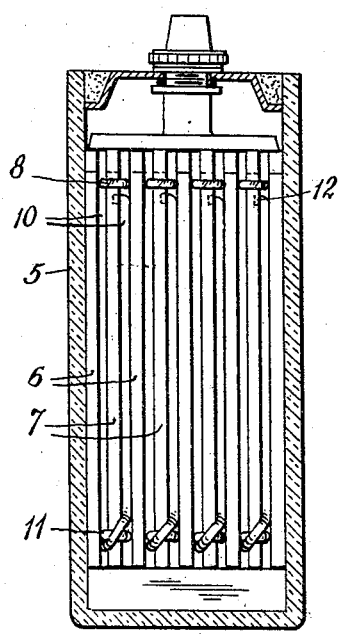
Figure 2:
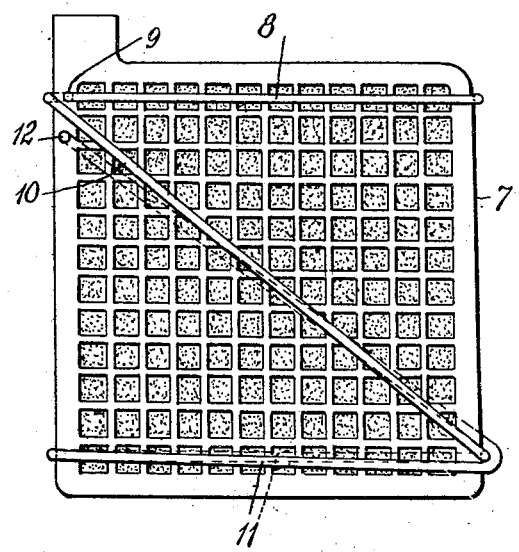
Figure 3:
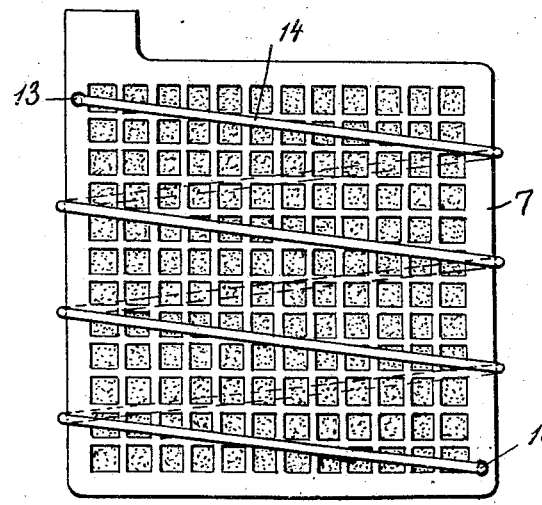

Further objects and advantages of the invention will be apparent as it is better understood by reference to the following specification and accompanying drawing, in which Fig. 1 is a view, partially in section, of a storage battery embodying the invention;

Fig. 2 is a side elevation of a battery element illustrating the manner of applying the bands thereto; and Fig. 3 is a similar view illustrating the application of the bands in a slightly different manner.

In carrying out the invention I prefer to employ celluloid which is available in the market in the form of "beading." This material is produced in continuous lengths and is ordinarily circular in section, although it may have a square or other section so far as its application to the present purpose is concerned. Celluloid is preferred, owing to its resistance to acids, its flexibility when in the form described, and its elasticity which permits stretching of the material over the battery elements and facilitates its retention in proper position thereon. Celluloid beading of round section and having a diameter from one-sixteenth to one-eighth of an inch is preferred, although the diameter may vary, depending upon the desired degree of separation of the battery elements.

The bands are preferably applied to the positive elements or plates for the reason that this arrangement permits assemblage of the battery elements in a jar of normal size in which there are usually an even number of positive plates and an odd number of negative plates. The bands may be applied to the negative plates, but in this case it would be necessary to modify the size of the battery jar. It is obviously preferable to utilize battery jars of standard dimensions and to apply the bands in such a manner that the usual number of elements may be assembled therein when the insulating bands have been applied to the elements.

Otherwise than in the substitution of the insulating bands for the separators, the battery may be substantially identical in its structural features with ordinary storage batteries. It may consist of a plurality of plates made up of the usual lead grids with a mixture of red lead and litharge pasted thereon. The bands may be applied either before or after the forming operation in which the pasted material on the positive plates is changed to peroxide of lead and that on the negative plates is reduced to spongy lead. The bands may be applied in various ways, but in the preferred form of the invention the continuous strip of beading is secured near one edge at the top of the plate, looped once around the plate, passed diagonally across one face of the plate, looped again around the lower part of the plate and passed diagonally across the opposite face of the plate, the free end being then fastened to the plate. To secure the ends of the bands it is sufficient to provide an opening of similar diameter through the plate, insert the ends and expand them slightly by a light blow with a suitable tool. Of course, the ends may be cemented together or to the plate by the use of a celluloid cement or other suitable material. A variation of the application of the bands consists in securing one end near the edge at the top of the plate and winding the band diagonally about the plate with several loops with the free end being secured to the plate at the edge near the bottom thereof. Other forms of winding will readily suggest themselves and will be adapted to secure the objects of the invention in a similar manner. When the bands have been applied in any suitable manner, the plates are assembled in a jar with the negative and positive plates alternating and the bands preventing contact of plates of opposite polarity.

The invention is particularly desirable in connection with the use of jelly electrolytes. A suitable electrolyte for the purpose may be prepared by mixing silicate of soda 8.3° Bé. and sulfuric acid 35.2° Bé. in the proportion of one part by volume of silicate of soda to 1.7 parts by volume of sulfuric acid. Such a mixture may be poured into the battery after the plates have been assembled until it covers the plates. The mixture will quickly jell. The composition described is merely illustrative and may be varied as to proportions and ingredients, jelly electrolytes being well known in the art. With such electrolytes, which are highly desirable in many types of batteries, particularly those used in automobiles, the use of insulating bands in place of separators permits reduction of the internal resistance of the battery to a minimum. Such batteries will stand heavy overcharges and abnormally high discharging rates without the disintegration which usually accompanies such abuse of ordinary storage batteries.

As to general advantages of the insulating bands, it will be noted that the bands may be applied to the plates before they are formed, and consequently the handling of separators and losses through breakage thereof in assembling the batteries are eliminated. Moreover, new separators are never required in batteries embodying the present invention.

Referring to the drawing, 5 indicates a container of suitable dimensions, the container being made of glass, vulcanized rubber or other suitable acid-resistant material. A plurality of negative plates 6 and positive plates 7 are supported within the container. The positive plates 7 are embraced by bands 8 of material such as celluloid as previously indicated. The end 9 of the band 8 may be secured in a suitable opening in the plate and looped around the upper portion of the plate, passing thence diagonally, as indicated at 10, across the face of the plate, then around the plate in another loop 11, returning diagonally across the opposite face of the plate, the end 12 being fastened in a suitable opening in the plate. Obviously the winding could be so arranged that the bands pass diagonally in opposite directions on the opposite faces of the plate. In Fig. 3 of the drawing the end 13 of the continuous band 14 is secured to the plate and the band is wound in a diagonal direction about the plate, its end 15 being similarly secured to the plate.

The present invention is particularly marked by the simplicity of its application since ordinary stock material may be employed without waste. The application of the bands is readily accomplished and the work may be performed by relatively unskilled labor at a minimum expense. The bands insure the proper separation of the positive and negative elements of the battery without causing increased internal resistance or introducing any of the difficulties ordinarily met in the manufacture and maintenance of storage batteries.

Other advantages than those mentioned may result from the application of the invention and various changes may be made in the details hereinbefore described without departing from the invention or sacrificing any of its advantages.

I claim:—

A plate for storage batteries carrying active material and having a strip of celluloid wound about the plate to serve as sole separating means when the plate is used with other plates in a storage battery.

In testimony whereof I affix my signature.

NORMAN DEXTER STURGES.